United States Patent
Teng et al.

(10) Patent No.: US 9,484,577 B2
(45) Date of Patent: Nov. 1, 2016

(54) POSITIVE ELECTRODE MATERIALS FOR LITHIUM ION BATTERIES AND PROCESS FOR PREPARING THE SAME

(75) Inventors: Xin Teng, Guangdong (CN); Wei He, Guangdong (CN); Ming He, Guangdong (CN); Ruyu Rao, Guangdong (CN); Bin Xiao, Guangdong (CN); Qiming Pan, Guangdong (CN)

(73) Assignee: Shenzhen Bak Battery Co., LTD., Shenzhen (CN)

( * ) Notice: Subject to any disclaimer, the term of this patent is extended or adjusted under 35 U.S.C. 154(b) by 1274 days.

(21) Appl. No.: 13/141,368

(22) PCT Filed: Dec. 22, 2009

(86) PCT No.: PCT/CN2009/075812
§ 371 (c)(1),
(2), (4) Date: Sep. 12, 2011

(87) PCT Pub. No.: WO2010/072136
PCT Pub. Date: Jul. 1, 2010

(65) Prior Publication Data
US 2012/0015250 A1    Jan. 19, 2012

(30) Foreign Application Priority Data
Dec. 22, 2008  (CN) .......................... 2008 1 0241390

(51) Int. Cl.
| | |
|---|---|
| *H01M 4/131* | (2010.01) |
| *H01M 4/1391* | (2010.01) |
| *H01M 4/505* | (2010.01) |
| *H01M 4/525* | (2010.01) |
| *H01M 10/0525* | (2010.01) |
| *H01M 4/36* | (2006.01) |
| *H01M 4/485* | (2010.01) |

(52) U.S. Cl.
CPC ........... *H01M 4/505* (2013.01); *H01M 4/1391* (2013.01); *H01M 4/364* (2013.01); *H01M 4/366* (2013.01); *H01M 4/485* (2013.01); *H01M 4/525* (2013.01); *H01M 10/0525* (2013.01); *Y02E 60/122* (2013.01); *Y02P 70/54* (2015.11)

(58) Field of Classification Search
None
See application file for complete search history.

(56) References Cited

U.S. PATENT DOCUMENTS

| | | | |
|---|---|---|---|
| 2004/0076884 A1 | 4/2004 | Lee et al. | |
| 2007/0178370 A1* | 8/2007 | Amine et al. | ................. 429/105 |
| 2009/0200509 A1* | 8/2009 | Suzuki et al. | ............. 252/182.1 |

FOREIGN PATENT DOCUMENTS

| | | |
|---|---|---|
| CN | 1697212 A | 11/2005 |
| CN | 101101987 A | 1/2008 |
| WO | 03/049218 A1 | 6/2003 |

OTHER PUBLICATIONS

International Search Report mailed Apr. 1, 2010.

* cited by examiner

*Primary Examiner* — Barbara Gilliam
*Assistant Examiner* — Helen M McDermott
(74) *Attorney, Agent, or Firm* — Michael A. Bondi; Moss & Barnett

(57) ABSTRACT

Provided are a positive electrode material for lithium ion batteries and a process for preparing the same. The positive electrode material for lithium ion batteries comprises a composite positive electrode material consists of $LiCoO_2$ and an auxiliary positive electrode material, the general formula of the auxiliary positive electrode material is $LiCo_{1-x-y}Ni_xMn_yO_2$, wherein $0<x<0.9$, $0<y<0.9$, $0<x+y<0.9$, and the $LiCoO_2$ is a modified $LiCoO_2$ coated with an $Al_2O_3$ film. The overcharge performance of the batteries can be significantly increased and the use amount of the overcharge additive can be reduced by using the positive electrode material so as to its improve the cycle performance of the batteries and improve the anti-overcharge safety in the special applications and the charging conditions.

18 Claims, No Drawings

POSITIVE ELECTRODE MATERIALS FOR LITHIUM ION BATTERIES AND PROCESS FOR PREPARING THE SAME

RELATED APPLICATIONS

The present application is a National Phase of International Application No. PCT/CN2009/075812, filed Dec. 22, 2009 and claims priority from, Chinese Application Number 200810241390.6, filed Dec. 22, 2008.

TECHNICAL FIELD

The present invention is directed to an electrode material for lithium ion batteries, and in particular to a positive electrode material for lithium ion batteries and a process for preparing the same.

BACKGROUND OF TECHNICAL ART

Lithium ion batteries, as the preferred energy source of electronic end products, have advantages of high specific energy, high voltage, safe and environmental friendship, long service life, and the like. With the continuous development of the functions of electronic end products, it requires higher criteria for specific energy, safety, and the like of lithium ion batteries. Therefore, the development of higher cost-effective electrode materials is an important topic for a researcher in the art of lithium ion batteries.

At present, $LiCoO_2$ is an active material for positive electrodes commonly used in lithium ion batteries. $LiCoO_2$ is commercialized earlier and the process for preparing $LiCoO_2$ is well-developed. $LiCoO_2$ has relatively stable electrochemical properties, good processing behaviors, high compacted density (3.7 to 3.9 $g/cm^3$), relatively high mass specific capacity (138 to 145 mAh/g), stable structure, good cycle performance (the capacity retention ratio of 88 to 91% after 1 C 300 cycles), high and stable voltage platform (80% of which is more than 3.6 V) and good compatibility with electrolyte solutions. However, $LiCoO_2$ is expansive. The cost of $LiCoO_2$ is higher and higher due to rare resource and continuous rise of $LiCoO_2$ price. The ternary material lithium nickel cobalt manganese oxide has good properties. The composite positive electrode material of the ternary material and $LiCoO_2$ has good cycle performance and volumetric specific capacity. Moreover, batteries using such positive electrode material can support overcharge voltage of about 1 C 4.7 V and have good safety so as to meet the conventional applications. However, the anti-overcharge safety of batteries is required to be improved in the special applications and charging conditions.

DISCLOSURE OF THE INVENTIONS

Technical Issues

One objective of the present invention is to resolve the above technical issues and provide a positive electrode material for lithium ion batteries having excellent anti-overcharge safety.

Another objective of the present invention is to provide a process for preparing the above positive electrode of lithium ion batteries.

Technical Solutions

The technical issues of the present invention are resolved by the following technical solutions.

A positive electrode material for lithium ion batteries, where $LiCoO_2$ is doped with an auxiliary positive electrode material having the general formula of $LiCo_{1-x-y}Ni_xMn_yO_2$, wherein 0<x<0.9, 0<y<0.9, 0<x+y<0.9 and the $LiCoO_2$ is a modified $LiCoO_2$ coated with an $Al_2O_3$ film.

The thickness of the $Al_2O_3$ film may be 0.1-0.4 μm.

The median diameter of the $LiCoO_2$ may be 9-20 μm. The median diameter may also be 12-15 μm.

The median diameter of primary particles of the auxiliary positive electrode material $LiCo_{1-x-y}Ni_xMn_yO_2$ may be 0.5-5 μm. The median diameter may also be 2-3.5 μm.

A lithium ion battery comprises electrode pieces of positive electrode, wherein the material of the electrode pieces of positive electrode comprises a composite positive electrode material consists of $LiCoO_2$ and an auxiliary positive electrode material, and the general formula of the auxiliary positive electrode material is $LiCo_{1-x-y}Ni_xMn_yO_2$, wherein 0<x<0.9, 0<y<0.9, 0<x+y<0.9, and the $LiCoO_2$ is a modified $LiCoO_2$ coated with an $Al_2O_3$ film.

A process for preparing a positive electrode material for lithium ion batteries comprises: mixing a conductive agent, a binder and a solvent; mixing a composite positive electrode material consists of an auxiliary positive electrode material and a modified $LiCoO_2$ coated with an $Al_2O_3$ film and a solvent, wherein the general formula of the auxiliary positive electrode material is $LiCo_{1-x-y}Ni_xMn_yO_2$, wherein 0<x<0.9, 0<y<0.9, 0<x+y<0.9; and mixing the mixtures as obtained in the above two steps.

The auxiliary positive electrode material $LiCo_{1-x-y}Ni_xMn_yO_2$ may be present at 10-40% by weight of the composite positive electrode material. The auxiliary positive electrode material $LiCo_{1-x-y}Ni_xMn_yO_2$ may also be present at 20-30% by weight of the composite positive electrode material.

The step of mixing the mixtures as obtained in the above two steps may further comprise:

a first mixing step of mixing and stirring the two obtained mixtures;

a second mixing step of adding a solvent to the stirred mixture and continuously stirring until homogeneous. A positive electrode slurry can be obtained after the mixing step. An electrode piece of positive electrode can be obtained by coating the positive electrode slurry to an aluminum foil.

In the first mixing step, the stirring speed may be 100-300 r/min and the stirring time may be 3 min to 1 h. In the second mixing step, the stirring speed may be 2000-5000 r/min and the stirring time may be 2-5 h. Certainly, the stirring speed and time can be adjusted as needed.

The conductive agent may be SP. The binder may be PVDF. The solvent may be NMP. Certainly, the conductive agent, binder and solvent can also be other materials which can be used to prepare a positive electrode of lithium ion batteries.

Beneficial Effects

The present invention has the following beneficial effects over the prior art:

(1) The positive electrode material used in the present invention consists of $LiCo_{1-x-y}Ni_xMn_yO_2$ and a modified $LiCoO_2$ coated with alumina, which can significantly increase the overcharge performance of battery cores, reduce the use amount of overcharge additives, further improve the cycle performance of batteries, and improve the anti-overcharge safety in the special applications and the charging conditions;

(2) The positive electrode material obtained by mixing $LiCoO_2$ and $LiCo_{1-x-y}Ni_xMn_yO_2$ is used to prepare a positive electrode to increase the volumetric specific capacity of batteries and simultaneously improve the cycle performance.

(3) The use of the positive electrode material reduces the use amount of $LiCoO_2$ so as to reduce the cost.

EMBODIMENTS OF THE INVENTIONS

The present invention is further illustrated in detail by the specific examples with the drawings.

Example 1

A composite positive electrode material consisting of $LiCoO_2$ and $LiCo_{1/3}Ni_{1/3}Mn_{1/3}O_2$ is used in the present example. The median diameter D50 of $LiCoO_2$ is 12 μm. The thickness of an $Al_2O_3$ film coated on an outer layer is 0.3 μm. The median diameter D50 of primary particles of $LiCo_{1/3}Ni_{1/3}Mn_{1/3}O_2$ is 2 μm; The median diameter D50 of secondary particles of $LiCo_{1/3}Ni_{1/3}Mn_{1/3}O_2$ is 10 μm. The conductive agent is SP (carbon black). The binder is PVDF (polyvinylidene fluoride). The solvent is NMP (N-methyl-pyrrolidone). A positive electrode slurry is prepared according to the weight ratio of $LiCoO_2$:$LiCo_{1/3}Ni_{1/3}Mn_{1/3}O_2$:SP: PVDF:NMP=80:20:2:2:40.

The positive electrode slurry was prepared according to the following steps: 1) the binder PVDF and 60% of the solvent NMP were mixed and stirred for 5 h (five hours) in a mixer, and then the conductive agent SP was added and the resultant mixture was stirred for further 5 h; 2) the composite positive, electrode material and 20% of the solvent NMP were mixed and stirred for 0.5 h in a mixer; 3) the mixture as obtained in step 1 and the mixture as obtained in step 2 were mixed and stirred at a stirring speed of 200 r/min for 0.5 h, and 20% of the solvent NMP was added and then the resultant mixture was stirred at a stirring speed of 3000 r/min for 3 h. The positive electrode slurry was prepared.

The prepared positive electrode slurry was coated on an aluminum (Al) foil with a thickness of 15 μm so as to prepare an electrode piece of positive electrode. The electrode piece of positive electrode was baked for 4 h. Graphite was used as a negative electrode. 65 g EMC (ethyl methyl carbonate), 35 g EC (ethylene carbonate) and 1.2 g VC (vinylene carbonate) were mixed homogeneously. $LiPF_6$ was added to the resultant mixture and sufficiently mixed. An electrolyte solution having $LiPF_6$ concentration of 1.0 mold, was prepared. A battery of type 423450A was prepared with the above positive electrode, negative electrode and electrolyte solution. The battery was stored, pre-charged and formed.

Example 2

A composite positive electrode material consisting of $LiCoO_2$ and $LiCo_{0.3}Ni_{0.5}Mn_{0.2}O_2$ is used in the present example. The median diameter D50 of $LiCoO_2$ is 9 μm. The thickness of an $Al_2O_3$ film coated on an outer layer is 0.1 μm. The median diameter D50 of primary particles of $LiCo_{0.3}Ni_{0.5}Mn_{0.2}O_2$ is 0.5 μm. The median diameter D50 of secondary particles of $LiCo_{0.3}Ni_{0.5}Mn_{0.2}O_2$ is 15 μm. The conductive agent is SP. The binder is PVDF. The solvent is NMP. The weight ratio of $LiCoO_2$:$LiCo_{0.3}Ni_{0.5}Mn_{0.2}O_2$:SP: PVDF:NMP is 90:10:2:2:40.

A positive electrode slurry was prepared according to the following steps: 1) the hinder and 60% of the solvent were mixed and stirred for 10 min in a mixer, and then the conductive agent was added and stirred for further 10 min, 2) the composite positive electrode material and 20% of the solvent were mixed and stirred for 10 min in a mixer; 3) the mixture as obtained in step 1 and the mixture as obtained in step 2 were mixed and stirred at a stirring speed of 100 r/min for 3 min, and 20% of the solvent was added and then stirred at a stirring speed of 2000 r/min for 2 h.

The prepared positive electrode slurry was coated on an aluminum foil with a thickness of 15 μm so as to prepare an electrode piece of positive electrode. Graphite was used as a negative electrode. 65 g EMC, 35 g EC and L2 g VC were mixed homogeneously. $LiPF_6$ was added and sufficiently mixed. An electrolyte solution having $LiPF_6$ concentration of 1.0 mol/L was prepared. A battery of type 423450A was prepared with the above positive electrode, negative electrode and electrolyte solution.

Example 3

A composite positive electrode material consisting of $LiCoO_2$ and $LiCo_{0.4}Ni_{0.2}Mn_{0.4}O_2$ is used in the present example. The median diameter D50 of $LiCoO_2$ is 20 μm. The thickness of an $Al_2O_3$ film coated on an outer layer is 0.4 μm. The median diameter D50 of primary particles of $LiCoO_4Ni_{0.2}Mn_{0.4}O_2$ is 5 μm. The median diameter D50 of secondary particles of $LiCo_{0.4}Ni_{0.2}Mn_{0.4}O_2$ is 20 μm. The conductive agent is SP. The binder is PVDF. The solvent is NMP. The weight ratio of $LiCoO_2$:$LiCoO_2$:$LiCo_{0.4}Ni_{0.44}O_2$: SP:PVDF:NMP is 60:40:2:2:40.

A positive electrode slurry was prepared according to the following steps: 1) the hinder and 60% of the solvent were mixed and stirred for 12 h in a mixer, and then the conductive agent was added and stirred for further 12 h; 2) the composite positive electrode material and 20% of the solvent were mixed and stirred for 1 h in a mixer; 3) the mixture as obtained in step 1 and the mixture as obtained in step 2 were mixed and stirred at a stirring speed of 300 r/min for 1 h, and 20% of the solvent was added and then stirred at a stirring speed of 5000 r/min for 5 h.

The prepared positive electrode slurry was coated on an aluminum foil with a thickness of 15 μm so as to prepare an electrode piece of positive electrode. Graphite was used as a negative electrode. 65 g EMC, 35 g EC and 1.2 g VC were mixed homogeneously. $LiPF_6$ was added and sufficiently mixed. An electrolyte solution having $LiPF_6$ concentration of 1.0 mol/L was prepared. A battery of type 423450A was prepared with the above positive electrode, negative electrode and electrolyte solution.

Example 4

A composite positive electrode material consisting of $LiCoO_2$ and $LiCo_{0.11}Ni_{0.4}Mn_{0.49}O_2$ is used in the present example. The median diameter D50 of $LiCoO_2$ is 15 μm. The thickness of an $Al_2O_3$ film coated on an outer layer is 0.2 μm. The median diameter D50 of primary particles of $LiCo_{0.11}Ni_{0.4}Mn_{0.49}O_2$ is 1 μm. The median diameter D50 of secondary particles of $LiCo_{0.11}Ni_{0.4}Mn_{0.49}O_2$ is 5 μm. The conductive agent is SP. The binder is PVDF. The solvent is NMP. The weight ratio of $LiCoO_2$:$LiCo_{0.11}Ni_{0.4}Mn_{0.49}O_2$: SP:PVDF:NMP is 70:30:2:2:40.

A positive electrode slurry was prepared according to the following steps: 1) the binder and 60% of the solvent were mixed and stirred for 2 h in a mixer, and then the conductive agent was added and stirred for further 10 h; 2) the composite positive electrode material and 20% of the solvent were mixed and stirred for 10 min in a mixer; 3) the mixture as obtained in step 1 and the mixture as obtained in step 2 were mixed and stirred at a stirring speed of 250 r/min for 20 min, and 20% of the solvent was added and then stirred at a stirring speed of 4000 r/min for 4 h.

The prepared positive electrode slurry was coated on an aluminum foil with a thickness of 15 μm so as to prepare an electrode piece of positive electrode. Graphite was used as a negative electrode. 65 g EMC, 35 g EC and 1.2 g VC were mixed homogeneously. $LiPF_6$ was added and sufficiently mixed. An electrolyte solution having $LiPF_6$ concentration of 1.0 mold, was prepared. A battery of type 423450A was prepared with the above positive electrode, negative electrode and electrolyte.

Example 5

A composite positive electrode material consisting of $LiCoO_2$ and $LiCo_{0.11}Ni_{0.01}Mn_{0.88}O_2$ is used in the present example. The median diameter D50 of $LiCoO_2$ is 18 μm. The thickness of an $Al_2O_3$ film coated on an outer layer is 0.25 μm. The median diameter D50 of primary particles of $LiCo_{0.11}Ni_{0.01}Mn_{0.88}O_2$ is 4 μm. The median diameter D50 of secondary particles of $LiCo_{0.11}Ni_{0.01}Mn_{0.88}O_2$ is 15 μm. The conductive agent is SP. The binder is PVDF. The solvent is NMP. A positive electrode slurry is prepared according to the weight ratio of $LiCoO_2:LiCo_{0.11}Ni_{0.01}Mn_{0.88}O_2$:SP: PVDF:NMP=75:25:2:2:40.

A positive electrode slurry was prepared according to the following steps: 1) the hinder PVDF and 60% of the solvent NMP were mixed and stirred for 5 h in a mixer, and then the conductive agent SP was added and stirred for further 5 h; 2) the composite positive electrode material and 20% of the solvent NMP were mixed and stirred for 0.5 h in a mixer; 3) the mixture as obtained in step 1 and the mixture as obtained in step 2 were mixed and stirred at a stirring speed of 200 r/min for 0.5 h, and 20% of the solvent was added and then stirred at a stirring speed of 3000 r/min for 3 h. The positive electrode slurry was prepared.

The prepared positive electrode slurry was coated on an aluminum foil with a thickness of 15 μm so as to prepare an electrode piece of positive electrode. The electrode piece of positive electrode was baked for 4 h. Graphite was used as a negative electrode, 65 g EMC, 35 g EC and 1.2 g VC were mixed homogeneously. $LiPF_6$ was added and sufficiently mixed. An electrolyte solution having $LiPF_6$ concentration of 1.0 mol/L was prepared. A battery of type 423450A was prepared with the above positive electrode, negative electrode and electrolyte. The battery was stored, pre-charged and formed.

Example 6

A composite positive electrode material consisting of $LiCoO_2$ and $LiCo_{0.11}Ni_{0.88}Mn_{0.01}O_2$ is used in the present example. The median diameter D50 of $LiCoO_2$ is 14 μm. The thickness of an $Al_2O_3$ film coated on an outer layer is 0.35 μm. The median diameter D50 of primary particles of $LiCo_{0.11}Ni_{0.88}Mn_{0.01}O_2$ is 3 μm. The median diameter D50 of secondary particles of $LiCo_{0.11}Ni_{0.88}Mn_{0.01}O_2$ is 10 μm. The conductive agent is SR. The binder is PVDF. The solvent is NMP. The weight ratio of $LiCoO_2$: $LiCo_{0.11}Ni_{0.88}Mn_{0.01}O_2$:SP:PVDF:NMP is 78:22:2:2:40.

A positive electrode slurry was prepared according to the following steps: 1) the binder and 60% of the solvent were mixed and stirred for 10 min in a mixer, and then the conductive agent was added and stirred for further 10 min; 2) the composite positive electrode material and 20% of the solvent were mixed and stirred for 10 min in a mixer; 3) the mixture as obtained in step 1 and the mixture as obtained in step 2 were mixed and stirred at a stirring speed of 100 r/min for 3 min, and 20% of the solvent was added and then stirred at a stirring speed of 2000 r/min for 2 h.

The prepared positive electrode slurry was coated on an aluminum foil with a thickness of 15 μm so as to prepare an electrode piece of positive electrode. Graphite was used as a negative electrode, 65 g EMC, 35 g EC and 1.2 g VC were mixed homogeneously. $LiPF_6$ was added and sufficiently mixed. An electrolyte solution having $LiPF_6$ concentration of 1.0 mol/L was prepared. A battery of type 423450A was prepared with the above positive electrode, negative electrode and electrolyte solution.

Example 7

A composite positive electrode material consisting of $LiCoO_2$ and $LiCo_{0.98}Ni_{0.01}Mn_{0.01}O_2$ is used in the present example. The median diameter D50 of $LiCoO_2$ is 13 μm. The thickness of an $Al_2O_3$ film coated on an outer layer is 0.16 μm. The median diameter D50 of primary particles of $LiCo_{0.98}Ni_{0.01}Mn_{0.01}O_2$ is 3.5 μm. The median diameter D50 of secondary particles of $LiCo_{0.98}Ni_{0.01}Mn_{0.01}O_2$ is 10 μm. The conductive agent is SP. The binder is PVDF. The solvent is NMP. A positive electrode slurry is prepared according to the weight ratio of $LiCoO_2$: $LiCo_{0.98}Ni_{0.01}Mn_{0.01}O_2$:SP:PVDF:NMP=73:27:2:2:40.

The positive electrode slurry was prepared according to the following steps: 1) the hinder PVDF and 60% of the solvent NMP were mixed and stirred for 5 h in a mixer, and then the conductive agent SP was added and stirred for further 5 h; 2) the composite positive electrode material and 20% of the solvent NMP were mixed and stirred for 0.5 h in a mixer; 3) the mixture as obtained in step 1 and the mixture as obtained in step 2 were mixed and stirred at a stirring speed of 200 r/min for 0.5 h, and t 20% of the solvent was added and then stirred at a stirring speed of 3000 r/min for 3 h. The positive electrode slurry was prepared.

The prepared positive electrode slurry was coated on an aluminum foil with a thickness of 15 μm so as to prepare an electrode piece of positive electrode. The electrode piece of positive electrode was baked for 4 h. Graphite was used as a negative electrode. 65 g EMC, 35 g EC and 1.2 g VC were mixed homogeneously. $LiPF_5$ was added and sufficiently mixed. An electrolyte solution having $LiPF_6$ concentration of 1.0 mol/L was prepared. A battery of type 423450A was prepared with the above positive electrode, negative electrode and electrolyte solution. The battery was stored, pre-charged and formed.

Example 8

A composite positive electrode material consisting of $LiCoO_2$ and $LiCo_{0.2}Ni_{0.4}Mn_{0.4}O_2$ is used in the present example. The median diameter D50 of $LiCoO_2$ is 16 μm. The thickness of an $Al_2O_3$ film coated on an outer layer is 0.14 μm. The median diameter D50 of primary particles of $LiCo_{0.2}Ni_{0.4}Mn_{0.4}O_2$ is 2.5 μm. The median diameter D50 of secondary particles of $LiCo_{0.2}Ni_{0.4}Mn_{0.4}O_2$ is 10 μm. The conductive agent is SP. The binder is PVDF. The solvent is NMP. A positive electrode slurry is prepared according to the weight ratio of $LiCoO_2:LiCo_{0.2}Ni_{0.4}Mn_{0.4}O_2$:SP:PVDF: NMP=80:20:2:2:40.

The positive electrode slurry was prepared according to the following steps: 1) the binder PVDF and 60% of the solvent NMP were mixed and stirred for 5 h in a mixer, and then the conductive agent SP was added and stirred for further 5 h; 2) the composite positive electrode material and 20% of the solvent NMP were mixed and stirred for 0.5 h in a mixer; 3) the mixture as obtained in step 1 and the mixture as obtained in step 2 were mixed and stirred at a stirring speed of 200 r/min for 0.5 h, and 20% of the solvent was added and then stirred at a stirring speed of 3000 r/min for 3 h. The positive electrode slurry was prepared.

The prepared positive electrode slurry was coated on an aluminum foil with a thickness of 15 μm so as to prepare an electrode piece of positive electrode. The electrode piece of positive electrode was baked for 4 h. Graphite was used as a negative electrode, 65 g EMC, 35 g EC and 1.2 g VC were mixed homogeneously. $LiPF_6$ was added and sufficiently mixed. An electrolyte solution having $LiPF_6$ concentration of 1.0 mol/L was prepared. A battery of type 423450A was prepared with the above positive electrode, negative electrode and electrolyte solution. and the battery was stored, pre-charged and formed.

Comparative Example 1

The differences between this comparative example and example 1 reside in that $LiCoO_2$ coated with metal oxide $Al_2O_3$ in example 1 is used as an active material for positive electrodes alone and $LiCoO_2$:SP:PVDF:NMP is 100:2:2:40 in comparative example 1.

The prepared positive electrode slurry was coated on an aluminum foil with a thickness of 15 μm so as to prepare an electrode piece of positive electrode. Graphite was used as negative electrode. 65 g EMC, 35 g EC and 1.2 g VC were mixed homogeneously. $LiPF_6$ was added and sufficiently mixed. An electrolyte solution having $LiPF_6$ concentration of 1.0 mol/L was prepared. A battery of type of 423450A was prepared with the above positive electrode, negative electrode and electrolyte solution.

Comparative Example 2

The differences between this comparative example and example 1 reside in that $LiCoO_2$, which is not coated with metal oxide, and $LiCo_{1/3}Ni_{1/3}Mn_{1/3}O_2$ are used as a positive electrode material, and $LiCoO_2$:$LiCo_{1/3}Ni_{1/3}Mn_{1/3}O_2$:SP:PVDF:NMP is 80:20:2:2:40

The prepared positive electrode slurry was coated on an aluminum foil with a thickness of 15 so as to prepare an electrode piece of positive electrode. Graphite was used as a negative electrode. 65 g EMC, 35 g EC and L2 g VC were mixed homogeneously. $LiPF_6$ was added and sufficiently mixed. An electrolyte solution having $LiPF_6$ concentration of 1.0 mol/L was prepared. A battery of type 423450A was prepared with the above positive electrode, negative electrode and electrolyte solution.

Comparative Example 3

The differences between this comparative example and example 1 reside in that the $LiCo_{1/3}Ni_{1/3}Mn_{1/3}O_2$ is used as a positive electrode material, and $LiCo_{1/3}Ni_{1/3}Mn_{1/3}O_2$:SP:PVDF:NMP is 100:2:2:40

The prepared positive electrode slurry was coated on an aluminum foil with a thickness of 15 μm so as to prepare an electrode piece of positive electrode. Graphite was used as a negative electrode. 65 g EMC, 35 g EC and 1.2 g VC were mixed homogeneously. $LiPF_6$ was added and sufficiently mixed. An electrolyte solution having $LiPF_6$ concentration of 1.0 mol/L was prepared. A battery of type 423450A was prepared with the above positive electrode, negative electrode and electrolyte solution.

The table 1 shows the data of the electrode pieces in each of the examples and comparative examples, the maximum available electrode density of a positive electrode, 1 C discharge electrode expressional capacity per gram of a positive electrode, capacity retention ratio after 1 C rate 100 charge-discharge cycles of batteries prepared by the electrode pieces.

TABLE 1

|  | Thickness of $Al_2O_3$ films (μm) | Maximum available electrode density of a positive electrode (g/cm³) | 1 C discharge expressional capacity per gram of a positive electrode (mAh/g) | Volumetric specific capacity (mAh/cm³) | Capacity retention ratio (1 C 100 cycles) | 1 C 5.5 V overcharge tests (passed or failed) |
|---|---|---|---|---|---|---|
| EX 1 | 0.3 | 4.05 | 139.6 | 565.38 | 94.40% | Passed |
| EX 2 | 0.1 | 4.1 | 146.8 | 601.88 | 92.90% | Passed |
| EX 3 | 0.4 | 3.95 | 135.5 | 535.225 | 92.50% | Passed |
| EX 4 | 0.2 | 4.05 | 135.7 | 549.585 | 92.40% | Passed |
| EX 5 | 0.25 | 3.95 | 132.5 | 523.375 | 92.90% | Passed |
| EX 6 | 0.35 | 4.15 | 146 | 605.9 | 92.80% | Passed |
| EX 7 | 0.16 | 4.05 | 140.6 | 569.43 | 92.10% | Passed |
| EX 8 | 0.14 | 4.05 | 134.5 | 544.725 | 93.50% | Passed |
| Comparative EX 1 |  | 4.15 | 139 | 576.85 | 91.40% | Failed |
| Comparative EX 2 |  | 4.05 | 139.2 | 563.76 | 94.80% | Failed |
| Comparative EX 3 |  | 3.6 | 138.9 | 500.04 | 95.70% | Failed | in view of the data in table 1, the secondary batteries prepared by the composite positive electrode materials in the present invention, comparing with the secondary batteries prepared by the positive electrode materials in the prior art, have higher maximum available electrode density and expressional capacity per gram of a positive electrode, excellent cycle performance, and significantly improve the overcharge properties of battery cores.

The present invention is further illustrated in detail by the above description with reference to the specific preferred embodiments. It should be appreciated that the present invention can be carried out without the limitation of the description. An artisan of ordinary skill in the art can make various simple deductions or replacements without deviating from the spirit of the present invention, which should be considered belonging to the scope of protection of the present invention.

What is claimed is:

1. A positive electrode material for lithium ion batteries, comprising a composite positive electrode material consisting of a modified $LiCoO_2$ coated with an $Al_2O_3$ film and an auxiliary positive electrode material,
    wherein the general formula of the auxiliary positive electrode material is $LiCo_{1-x-y}Ni_xMn_yO_2$,
    wherein $0<x<0.9$, $0<y<0.9$, $0<x+y<0.9$, and
    wherein the thickness of the $Al_2O_3$ film is 0.3-0.4 μm.

2. The positive electrode material for lithium ion batteries of claim 1, wherein the auxiliary positive electrode material $LiCo_{1-x-y}Ni_xMn_yO_2$ is present at 10-40% by weight of the composite positive electrode material.

3. The positive electrode material for lithium ion batteries of claim 2, wherein the auxiliary positive electrode material $LiCo_{1-x-y}Ni_xMn_yO_2$ is present at 20-30% by weight of the composite positive electrode material.

4. The positive electrode material for lithium ion batteries of claim 1, wherein the median diameter of the $LiCoO_2$, without the $Al_2O_3$ film, is 9-20 μm.

5. The positive electrode material for lithium ion batteries of claim 4, wherein the median diameter of the $LiCoO_2$, without the $Al_2O_3$ film, is 12-15 μm.

6. The positive electrode material for lithium ion batteries of claim 1, wherein the median diameter of primary particles of the auxiliary positive electrode material $LiCo_{1-x-y}Ni_xMn_yO_2$ is 0.5-5 μm.

7. The positive electrode material for lithium ion batteries of claim 6, wherein the median diameter of primary particles of the auxiliary positive electrode material $LiCo_{1-x-y}Ni_xMn_yO_2$ is 2-3.5 μm.

8. The positive electrode material for lithium ion batteries of claim 1, wherein
    the median diameter of the $LiCoO_2$, without the $Al_2O_3$ film, is 9-20 μm, and
    the median diameter of primary particles of the auxiliary positive electrode material $LiCo_{1-x-y}Ni_xMn_yO_2$ is 0.5-5 μm.

9. The positive electrode material for lithium ion batteries of claim 8, wherein
    the median diameter of secondary particles of the auxiliary positive electrode material $LiCo_{1-x-y}Ni_xMn_yO_2$ is greater than the median diameter of primary particles of the auxiliary positive electrode material $LiCo_{1-x-y}Ni_xMn_yO_2$, and is 5-20 μm.

10. The positive electrode material for lithium ion batteries of claim 1, wherein
    the median diameter of the $LiCoO_2$, without the $Al_2O_3$ film, is 12-15 μm,
    the median diameter of primary particles of the auxiliary positive electrode material $LiCo_{1-x-y}Ni_xMn_yO_2$ is 2-3.5 μm, and
    the median diameter of secondary particles of the auxiliary positive electrode material $LiCo_{1-x-y}Ni_xMn_yO_2$ is greater than the median diameter of primary particles of the auxiliary positive electrode material $LiCo_{1-x-y}Ni_xMn_yO_2$, and is 10-15 μm.

11. A lithium ion battery comprising electrode pieces of positive electrode,
    wherein a material of the electrode pieces of positive electrode comprises a composite positive electrode material consisting of a modified $LiCoO_2$ coated with an $Al_2O_3$ film and an auxiliary positive electrode material, the general formula of the auxiliary positive electrode material is $LiCo_{1-x-y}Ni_xMn_yO_2$,
    wherein $0<x<0.9$, $0<y<0.9$, $0<x+y<0.9$, and
    wherein the thickness of the $Al_2O_3$ film is 0.3-0.4 μm.

12. A process for preparing a positive electrode of lithium ion batteries, comprising:
    mixing a conductive agent, a binder and a solvent;
    mixing a composite positive electrode material consisting of an auxiliary positive electrode material and a modified $LiCoO_2$ coated with an $Al_2O_3$ film and a solvent, the general formula of the auxiliary positive electrode material is $LiCo_{1-x-y}Ni_xMn_yO_2$,
        wherein $0<x<0.9$, $0<y<0.9$, $0<x+y<0.9$, and
        wherein the thickness of the $Al_2O_3$ film is 0.3-0.4 μm; and
    mixing the mixtures as obtained in the above two steps.

13. The process for preparing a positive electrode of lithium ion batteries of claim 12, wherein the auxiliary positive electrode material $LiCo_{1-x-y}Ni_xMn_yO_2$ is present at 10-40% by weight of the composite positive electrode material.

14. The process for preparing a positive electrode of lithium ion batteries of claim 13, wherein the auxiliary positive electrode material $LiCo_{1-x-y}Ni_xMn_yO_2$ is present at 20-30% by weight of the composite positive electrode material.

15. The process for preparing a positive electrode of lithium ion batteries of claim 12, wherein the step of mixing the mixtures as obtained in the above two steps comprises:
    a first mixing step of mixing and stirring the two obtained mixtures; and
    a second mixing step of adding a solvent to the stirred mixture and continuously stirring until homogeneous.

16. The process for preparing a positive electrode of lithium ion batteries of claim 15, wherein in the first mixing step, the stirring speed is 100-300 r/min and the stirring time is 3 min to 1 h; and in the second mixing step, the stirring speed is 2000-5000 r/min and the stirring time is 2-5 h.

17. The process for preparing a positive electrode of lithium ion batteries of claim 16, wherein in the step of mixing a conductive agent, a binder and a solvent, the amount of the added solvent is 60% by weight of the total solvents; in the step of mixing a composite positive electrode material and a solvent, the amount of the added solvent is 20% by weight of the total solvents; and in the second mixing step, the amount of the added solvent is 20% by weight of the total solvents.

18. The process for preparing a positive electrode of lithium ion batteries of claim 12, wherein the conductive agent is SP, the binder is PVDF and the solvent is NMP.

* * * * *